A. V. LIPINSKI.
METHOD AND APPARATUS FOR CARRYING OUT CHEMICAL REACTIONS BY MEANS OF MAGNETICALLY SPREAD OUT ELECTRIC ARCS.
APPLICATION FILED MAR. 15, 1916.
1,290,600.
Patented Jan. 7, 1919.
3 SHEETS—SHEET 1.
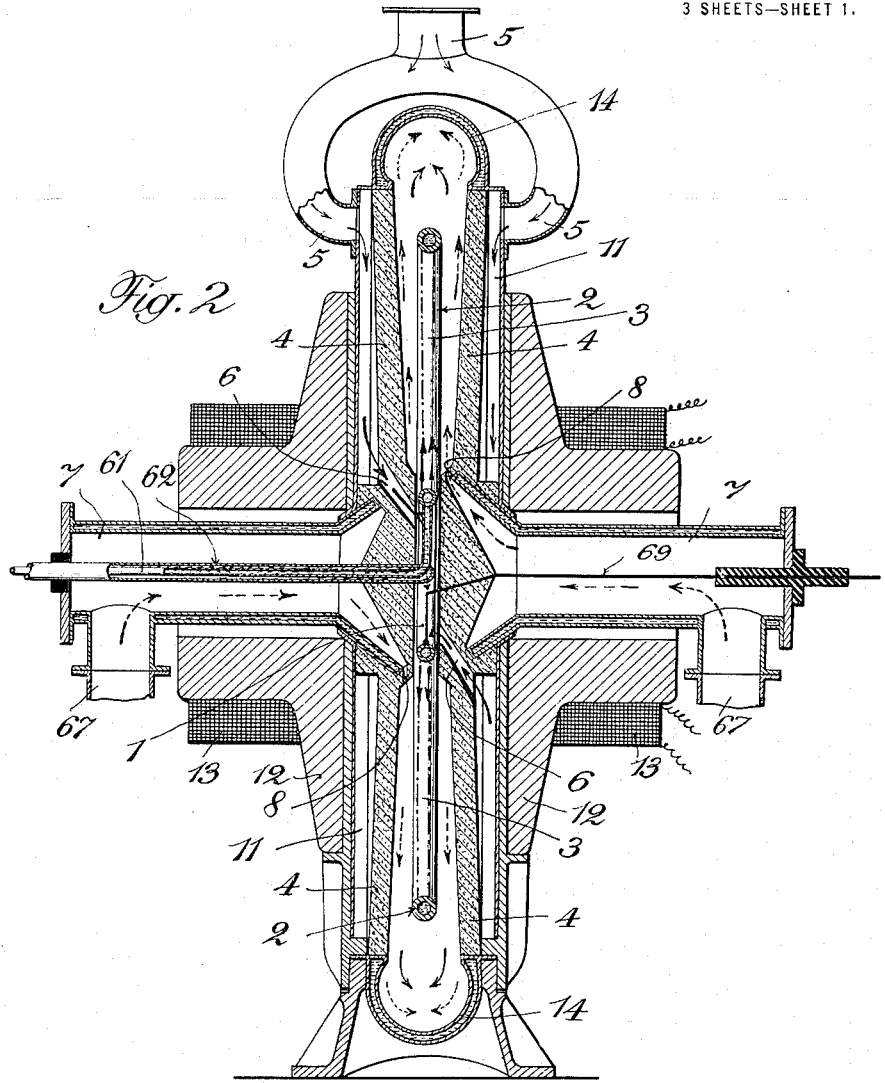
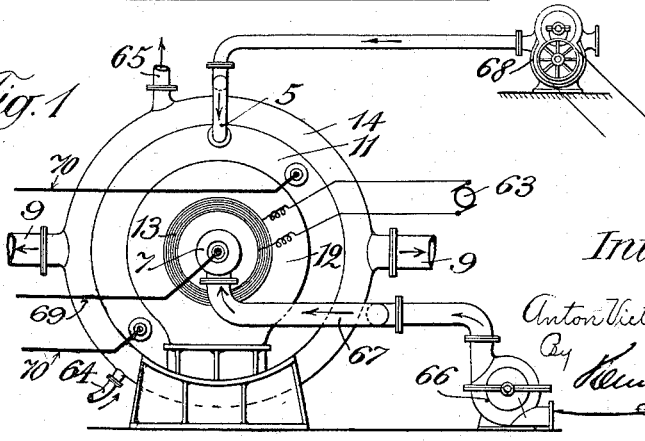
Inventor:
Anton Victor Lipinski A. V. LIPINSKI.
METHOD AND APPARATUS FOR CARRYING OUT CHEMICAL REACTIONS BY MEANS OF MAGNETICALLY SPREAD OUT ELECTRIC ARCS.
APPLICATION FILED MAR. 15, 1916.
1,290,600.
Patented Jan. 7, 1919.
3 SHEETS—SHEET 2.
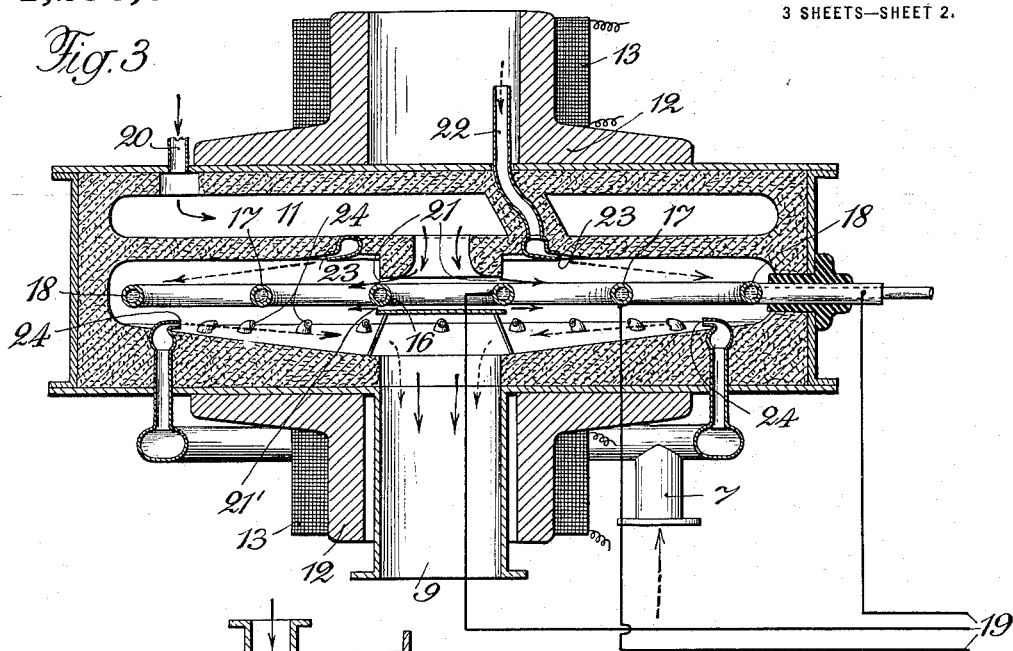
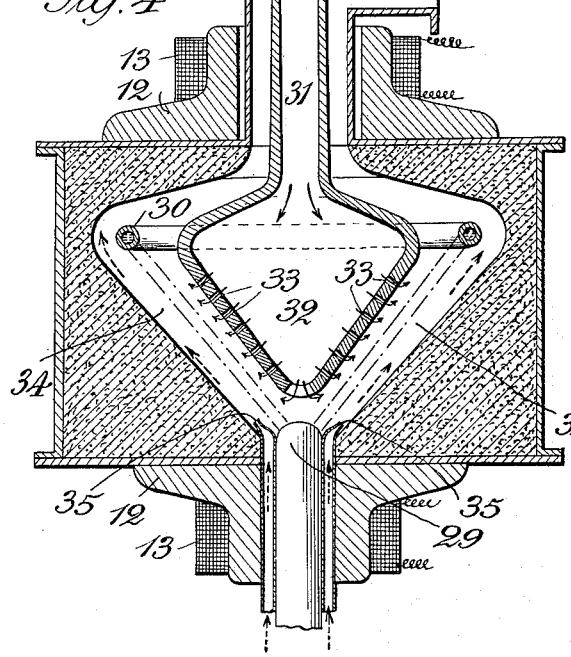
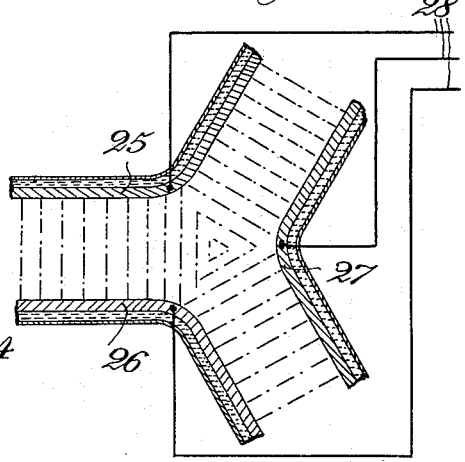
Inventor:
Anton Victor Lipinski
atty.

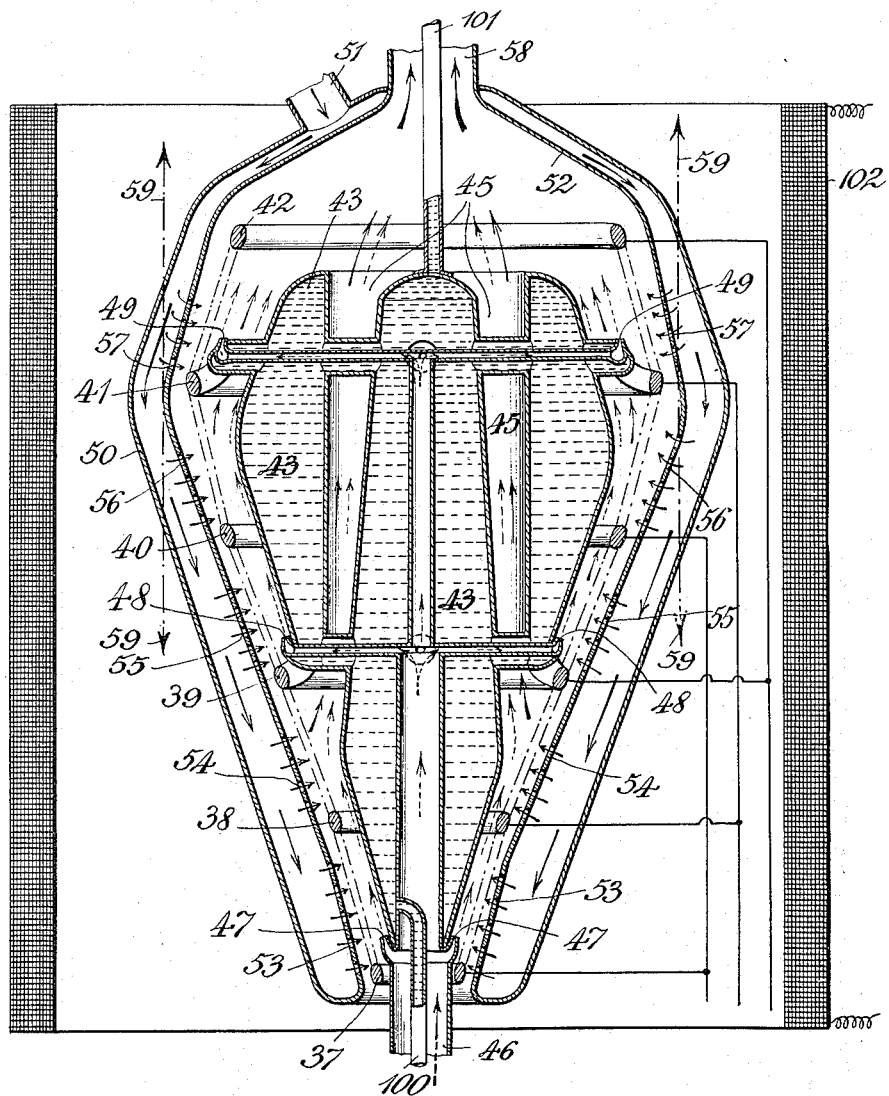

UNITED STATES PATENT OFFICE.

ANTON VICTOR LIPINSKI, OF ZURICH, SWITZERLAND.

METHOD AND APPARATUS FOR CARRYING OUT CHEMICAL REACTIONS BY MEANS OF MAGNETICALLY-SPREAD-OUT ELECTRIC ARCS.

1,290,600.     Specification of Letters Patent.     Patented Jan. 7, 1919.

Application filed March 15, 1916. Serial No. 84,426.

*To all whom it may concern:*

Be it known that I, ANTON VICTOR LIPINSKI, a citizen of the Republic of Switzerland, residing at Zurich, Switzerland, have invented new and useful Improvements in Methods and Apparatus for Carrying Out Chemical Reactions by Means of Magnetically-Spread-Out Electric Arcs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

By means of the electrical arc it is now possible to obtain exceedingly high temperatures in spaces restrictable at will, such as it would be impossible to obtain by any other means. Aside from the purely thermic action, the arc, in gas reactions and in reactions between gases and solid substances, exerts also molecular influences on the reacting substances, which are caused by the ionic impetus in the space occupied by the arc, and by the various purely electrical phenomena.

In the carrying out of gas reactions, as for instance in making nitric oxids or prussic acid, it is essential that the gas mixture under treatment, after having been highly heated by the arc, be chilled very abruptly, and furthermore, that the gases of reaction are subjected only once and only sufficiently long to the highest temperature, as is necessary to assure the proper chemical conversion.

There have been already proposed methods and furnaces for carrying out gas reactions in the electric arc, none of which however meet all the requirements above referred to. Either the arc is drawn out by means of magnets from small to large size whereby, owing to the brisk motions, pronounced gas oscillations are set up, which cause the reaction gases to intermix repeatedly and prevent thereby effective chilling, or the arc is caused to wander by the gas jets impinging on it. The same gas jet will then impinge repeatedly on the arc, which latter offers only a relatively small surface of attack, and an intensive reciprocal action between arc and gas and the requisite chilling medium will obviously not be obtained.

The present invention now refers to a procedure and apparatus by which the reactions in gas mixtures and between gases and solids can be carried out with due regard to the nature of the respective reaction materials.

According to the present invention between the electrodes, which latter are equidistantly disposed over their operative surfaces, the electric arcs are struck and are spread out by means of a magnetic field intersecting at any desired angle, and substances are then blown in, so that the wavering flame structures formed by the spreading are shaped into flat, disk-like or thin-walled, coherent flame structures, resembling a surface of revolution.

Two groups can then be distinguished, depending upon the nature of the conversion of the blown in substances to be obtained in the furnace: the actual reaction media within which the conversion is to take place, and the chilling media, which are introduced solely for the rapid cooling of the former below the temperature of decomposition of the obtained product.

For introducing these substances into the flame formation for shaping the latter, the reaction substances may be introduced from the one side and the chilling media from the opposite side of the flame structure, and the former may be conducted in such a manner that they are entrained through the zone of highest heat by the suction of the chilling media; or the reaction substances and the chilling substances may be introduced at the same side of the flame, whereby the former enter directly the zone of highest heat and are then cooled off by the passing chilling media. This latter action may take place either at one or at both sides of the flame structure.

The essential advantages of my present method reside primarily in the fact that, by reason of the localization of the arc discharges to a restricted disk-shaped space, the resulting flame structure conforms exceedingly closely and stably to the course of current determined by the construction of the furnace, for in the indicated path there are always present sufficiently ionized gases to assure the passage of current.

This flame stability calls for a low ignition tension and for a high reduction factor between ignition and working voltage (compared with furnaces with rod or column shaped arcs).

The second advantage consists in that the reaction substances enter the zone of highest temperature only once and over a large surface and can then, on leaving this zone, be suddenly chilled by the chilling media of low temperature. This cooling action takes place also over an extended area by contact and by successive mixing of the reaction substances with the chilling substances. When proceeding according to the present invention, a higher concentration of the product in the gas mixture will result, which is of eminent value for instance in fixing nitric oxids from the air; or by equal concentration, when operating on a large scale, increased output can be obtained.

The third advantage is that the flowing-back of the reaction substances into the reduction zone and an undue continuance therein is prevented by the described gas introduction, so that a re-decomposition of the product or a decomposition of the substances which were not converted by the reaction, is prevented owing to the considerable difference in the temperatures obtaining respectively in the reaction and chilling zones.

Chilling may take place simultaneously at several points and the resulting substances may be carried out of the reaction zone at one or more points.

For chilling purposes we can use besides cooled gas or gases having the same composition as the initial gas mixture (for instance air in the fixing of nitric oxids) or having a lower percentage of reaction substances (for instance the residue gases in prussic acid making and other cyclic reactions), also pulverous substances, if desired mixed with a gas, which could then combine with the reaction substances. Also halogen combinations, metal oxids and like combinations, which are decomposed by heat and then give off gases or vapors favoring reaction, and which, on being decomposed, absorb heat.

In the accompanying drawings are shown, by way of example, several constructional modifications of apparatus adapted for carrying out my present invention.

Figure 1 represents a front elevation of one form of electric furnace, of which Fig. 2 shows a vertical central cross section on an enlarged scale. Fig. 3 shows a vertical median section through another form of furnace. Fig. 4 represents a vertical central section of a further modification of furnace. Fig. 5 shows a three-phase electrode arrangement in section and Fig. 6 still another form of furnace arrangement in vertical section on the central plane.

In Fig. 2 are shown two water cooled annular electrodes 1 and 2 of metal, concentrically disposed in a vertical plane. With the electrode 1 communicate the inlet pipe 61 and the outlet pipe 62 for the cooling water. The outer electrode 2 is likewise provided with water cooling, of which however the inlet and outlet pipes are not shown in the figures. Both annular electrodes are disposed between the two disks 4, of fire brick and supported in the chamber 11. To the inner electrode 1 leads a current conductor 69, and to the outer electrode 2 two such conductors 70 are connected, leading to a suitable source of electricity either alternating or direct, not shown. The substances to be treated are forced by the blower 68 with controllable velocity through a pipe 5 into chamber 11, without the fire brick disks 4. In this chamber 11 the substances are preheated. Through the nozzle-shaped passages 6 in the disks 4 the substances are then blown into the space formed by the inner electrode 1. The chamber 11 is arranged between two pole shoes 12, each carrying magnet winding 13 charged by the continuous current generator 63, so that a strong magnetic field obtains between the pole shoes. Two water cooled pipes 7 are arranged centrally of the pole shoes 12 and lead up to, and communicate with slotted nozzles 8 provided in the fire brick disks. These nozzles 8, circularly disposed, open near the outer periphery of the inner electrode into the space 3 between the two electrodes. A blower 66 blows gases, which, as it were, may be chilling gases or reaction gases, through the pipe 67 into the pipes 7. The space between the two brick disks 4 is surrounded by a water jacket 14 provided with gas discharge pipes, not shown here. The cooling water enters this water jacket 14 through pipe 64 and a vent pipe 65 serves to carry off the vapors generated on operation.

The operation of the described apparatus is the following:

After in well known manner one or more arcs are struck between the annular electrodes 1 and 2, there is imparted to these arcs by the action of the magnetic field a very high rotation or waves of high amplitude. The arcs on wandering always find a uniform distance between the two electrodes, which greatly aids in their maintenance. Reaction gases, entering through pipe 5 into chamber 11 and pre-heated therein, are now forced into the space within the inner electrode 1 through the nozzles 6 and pass out at either side of this electrode, grip the magnetically spread out arc between them and form the flame structure into a continuous thin disk. Depending upon the kind of conversion undertaken, chilling gases may be forced through pipes 7 and the nozzles 8 with great velocity into the reaction chamber between the disks 4, and pass then along the layer of the reaction gases on the farther side thereof. The reaction gases, and if chilling gases have been used, these also, collect in the annular chamber formed by the water jacket 14 and are withdrawn therefrom through the pipes 9.

By this means it is possible to have the electric flame disk or the reaction zone relatively thin, only a few centimeters in thickness, and to retain it without lateral deflection in always the same plane. The gradual introduction of the reaction gas treated in the reaction zone into the chilling zone takes place uniformly all over the face of the disk, and the chilling may be caused by blowing in chilling media over a smaller or larger area. The furnace may be run on a pressure below or above atmospheric pressure.

In the construction of furnace according to Fig. 3 the water cooled annular electrodes 16, 17, 18 are connected up to a polyphase system 19. An inlet pipe 20 leads to a preheating chamber 11 and a pipe 15 connects this chamber with two slotted annular nozzles 21, 21', situated near the internal electrode 16 on either side thereof, where the preheated reaction gases pass out. The chilling gases are forced in through the pipe 22, which leads up to an annular slot nozzle 23, onto the upper face of the electrodes. These latter 16, 17, 18 are disposed within a fire brick chamber, which is provided below with a central outlet 9 for the substances treated in the furnace. In the underside of the electrodes near the outer one 18 are provided in a circle a plurality of nozzles 24, likewise adapted for the introduction of cooling gases. Without the brick chamber are provided two pole shoes 12, which are excited by the windings 13.

In operation, arcs are struck between the annular electrodes, a magnetic field is generated between the pole shoes 12 and the arcs are thereby formed to a flame structure. This latter is now flattened out to a uniformly thin, continuous disk by blowing in reaction gases through the nozzles 21 and 21' at either side of the flame. The upper layers of reaction gases are chilled off at the side away from the flame structure by the blown in chilling gases, which are conducted like the reaction gases from the center toward the periphery. The reaction gases introduced through the annular nozzle 21' are cooled off by the chilling media blown in through nozzles 24 in a direction opposite to that of the reaction gases. All of the gases are withdrawn through pipe 9.

In Fig. 5 we see the water cooled electrodes 25, 26, 27 connected up to a three-phase system. The arcs are flattened out in well known manner by the not specially shown pulsating or constant magnetic field into a thin flame structure whose form is determined by the electrodes and by introducing reaction gases at the reaction zones, as described above with reference to Fig. 3.

The shown forms of furnace arrangements show that the cooling gases may be conducted in the same, in opposite, or oblique direction, and that the nozzles, instead of near the center of the furnace, may also be disposed at its periphery, and that the chilling media may be blown against or into the flame disk in countercurrent to the reaction gases.

The form of furnace shown in Fig. 4 is provided with a rodshaped electrode 29 and with a facing annular electrode 30. The reaction gases enter at 31 into chamber 32 where they are highly preheated. Through apertures 33, suitably disposed in the wall of this chamber, the reaction gases then pass at low velocity into the bricked up reaction chamber 34. Cold chilling gas is blown into this chamber 34 at high velocity through the annular nozzle 35 which encircles the electrode 29. The products of reaction pass out through the discharge pipe 19. By the pole shoes 12, provided with magnetic winding 13, the arcs formed between the two electrodes are magnetically influenced, in such a manner that the flames are flattened out and the reaction gases issuing through the orifices 33 of chamber 32 and the chilling substances blown in through the annular nozzle, cause the formation of a thin walled cone-shaped flame structure between the electrodes 29 and 30. Also in this type of furnace the special manner of guiding the gases prevents the flame structure from deviating laterally from the conoidal shape due to the relative arrangement of the electrodes.

The form of construction illustrated in Fig. 6 shows the arrangement for producing a plurality of superposed arc cones. Annular electrodes 37, 38, 39, 40, 41, 42 are arranged around a hollow cooler 43, superposedly spaced apart and insulated from one another, and are connected up to a multiphase system 44. The cooler is fed by a conduit 100, and the hot water and resulting vapor is carried off through conduit 101. The cooler, further, is provided with an annular flue 45 starting just above the third electrode 39. A pipe 46, extending axially of the cooler, communicates with three rows of nozzles 47, 48, 49, arranged above one another, for the introduction of the chilling medium (dotted arrows). The first row of nozzles 47 opens just above the annular electrode 37, the second row 48 just above the electrode 39, and the third row 49 just above the electrode 41. The entire apparatus is inclosed in a double walled shell into which the reaction gases (full line arrows) are conducted through the pipe 51 and from out of which they pass into the chamber formed by the inner wall 52 through series of apertures 53, 54, 55, 56 and 57 in this wall 52 near the flame cones produced between the electrodes. The treated products are carried off by the discharge pipe 58. By the magnetic coil 102, connected up to a source of electricity not specially shown, the arcs formed between the electrodes are magnetically controlled in well known manner.

The annular electrodes 37, 38, 39, 40, 41 and 42 are subdivided into pairs, the respective electrodes of each pair being substantially equidistantly spaced apart, while the interspaces between the individual pairs may vary. The arcs, produced between the electrodes are spread out by the action of the magnetic field. The reaction gases enter the shell 50 through pipe 51, are preheated, pass out through the series of passage 53—57, pass through the arc cones, aided therein by the suction produced by the chilling gases issuing from the rows of nozzles 47, 48, 49, and are chilled on leaving the arc cones by the forced in chilling gases. The thus conducted reaction and chilling gases shape the magnetically spread arc surfaces into thin homogeneous, uninterrupted flame cones, which are strictly confined to the cone superficies determined by the electrodes. The chilling gases exert a sucking action on the products produced by the flame formation and carry them along so that re-decomposition is prevented.

The gases treated by the electrodes 37, 38 and 39 pass out through the annular flue 45, and the gases treated by the electrodes 39, 40 and 41 pass along the upper part of the wall of the cooler 43; and lastly these gases, which are treated by the arc between the electrodes 41 and 42 pass out directly with the chilling gases. A solid body of refractory material, having conduits 46 and 45 and passages leading to the rows of nozzles 48 and 49, can take place of the watercooled hollow body 43.

This last described type of furnace can operate with high energies. Since the treatment of the reaction media is carried out on different levels, and these substances which are treated in the lower part of the furnace are carried off by separate flues, these latter escaping substances are prevented from coming again into contact with other flame cones.

The furnace, according to Fig. 4, may also be provided with a plurality of annular electrodes arranged one above the other, such as just described with reference to Fig. 6.

What I claim is:—

1. The method, which comprises producing a dispersed arc between electrodes arranged equidistant from one another throughout their lengths thereby maintaining a flame sheet between the electrodes, supplying gas to both sides of the spread flame over its entire surface whereby a closed flame sheet of uniform shape, determined by the shape of the electrodes, is maintained under all conditions of operation.

2. The method, which comprises producing a dispersed arc between electrodes arranged equidistant from one another thereby maintaining a flame sheet bounded by the electrodes, maintaining a gas current over the whole of both faces of said spread arc, one of which currents operates as a gas wall support against deformation of the arc and the other current maintaining the flame against its support.

3. The method, which comprises producing a dispersed arc against equidistant electrodes, thereby maintaining a flame sheet bounded by the electrodes, supplying cooling gas at different points of the flame sheet to maintain a supporting gas wall for the flame over its entire surface, and supplying reacting gases to the other side of said flame, and withdrawing the products of reaction at a plurality of points from the flame.

4. The method, which comprises forming a dispersed arc between equidistant opposed surfaces, supplying a reacting medium at one velocity at an angle to the surface of the dispersed arc and supplying a cooling medium of another velocity over the whole surface of the arc and protected therefrom by the products of reaction.

5. The method, which comprises forming a dispersed arc between equidistant ring electrodes, supplying a reacting medium to the opposite surfaces of the arc and simultaneously entraining the products of reaction and cooling them by a high speed current of cooling medium directed substantially parallel to the surfaces of the arc.

6. An electric furnace comprising at least three ring electrodes whose arcing surfaces are substantially equidistant from one another, a source of supply of polyphase current connected to said electrodes, an electromagnet arranged to disperse the arcs formed between said electrodes, means to supply reacting material to the arcs formed between the electrodes, means to supply a cooling medium along both sides of the arcs, and means to conduct the products from the zone of reaction.

In testimony that I claim the foregoing as my invention, I have signed my name in presence of two subscribing witnesses.

ANTON VICTOR LIPINSKI.

Witnesses:
ERNST FISCHER,
CARL GUBLER.